Aug. 22, 1933.  K. DAVIS  1,923,917
PROCESS AND MECHANISM FOR SEPARATING INTERMIXED DIVIDED MATERIALS
Filed June 20, 1927  8 Sheets-Sheet 1
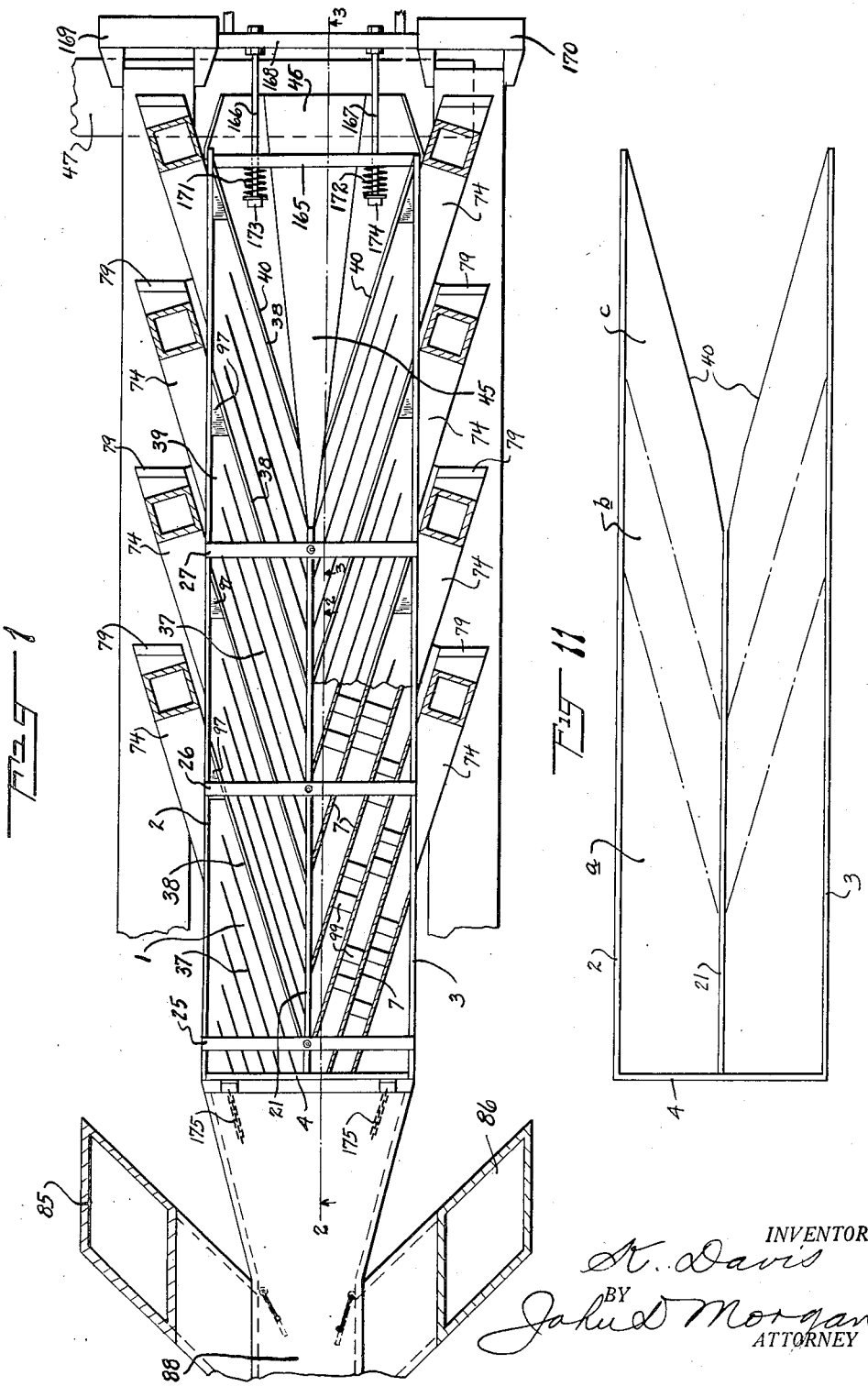
INVENTOR.
K. Davis
BY John D. Morgan
ATTORNEY

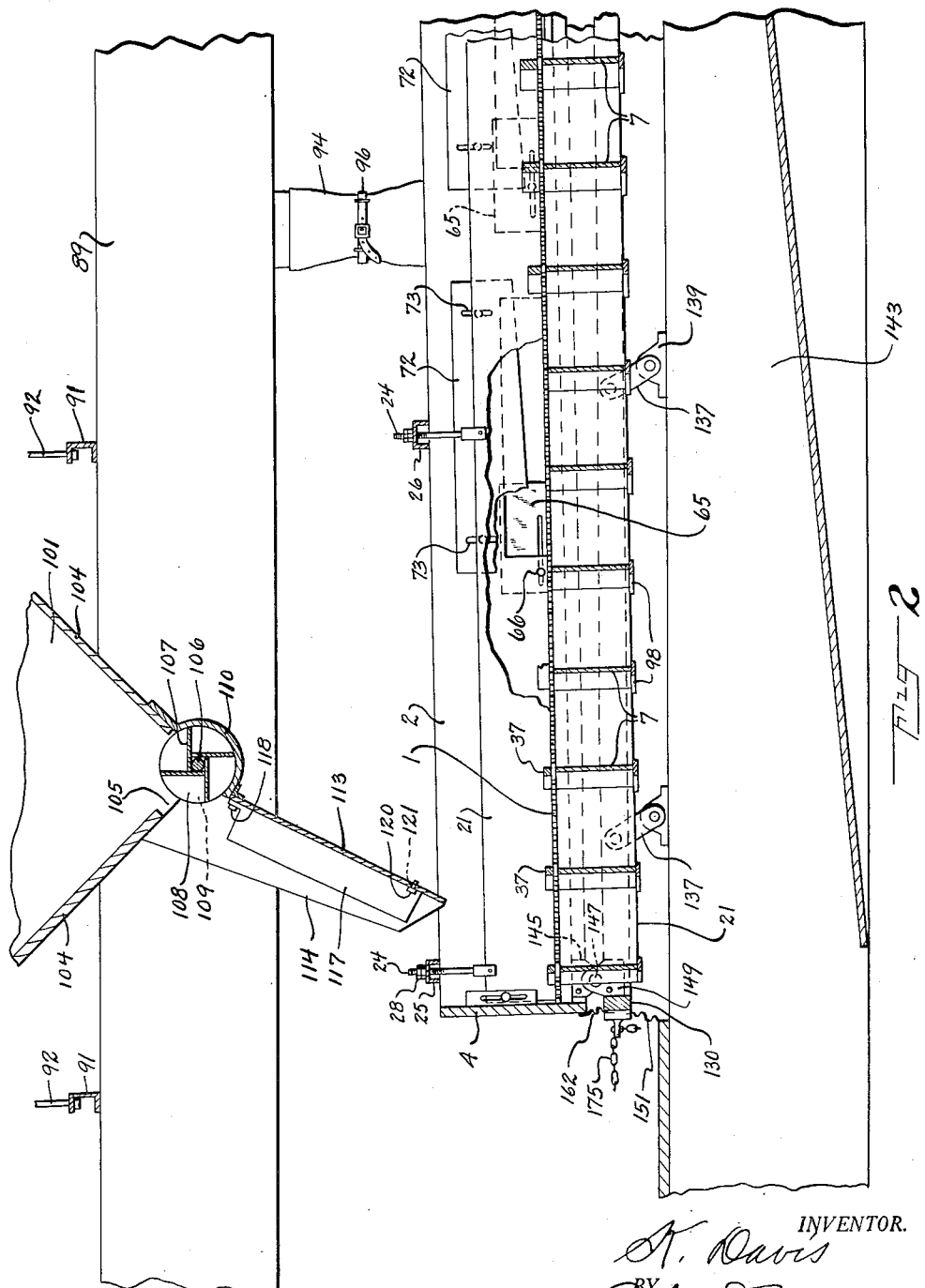

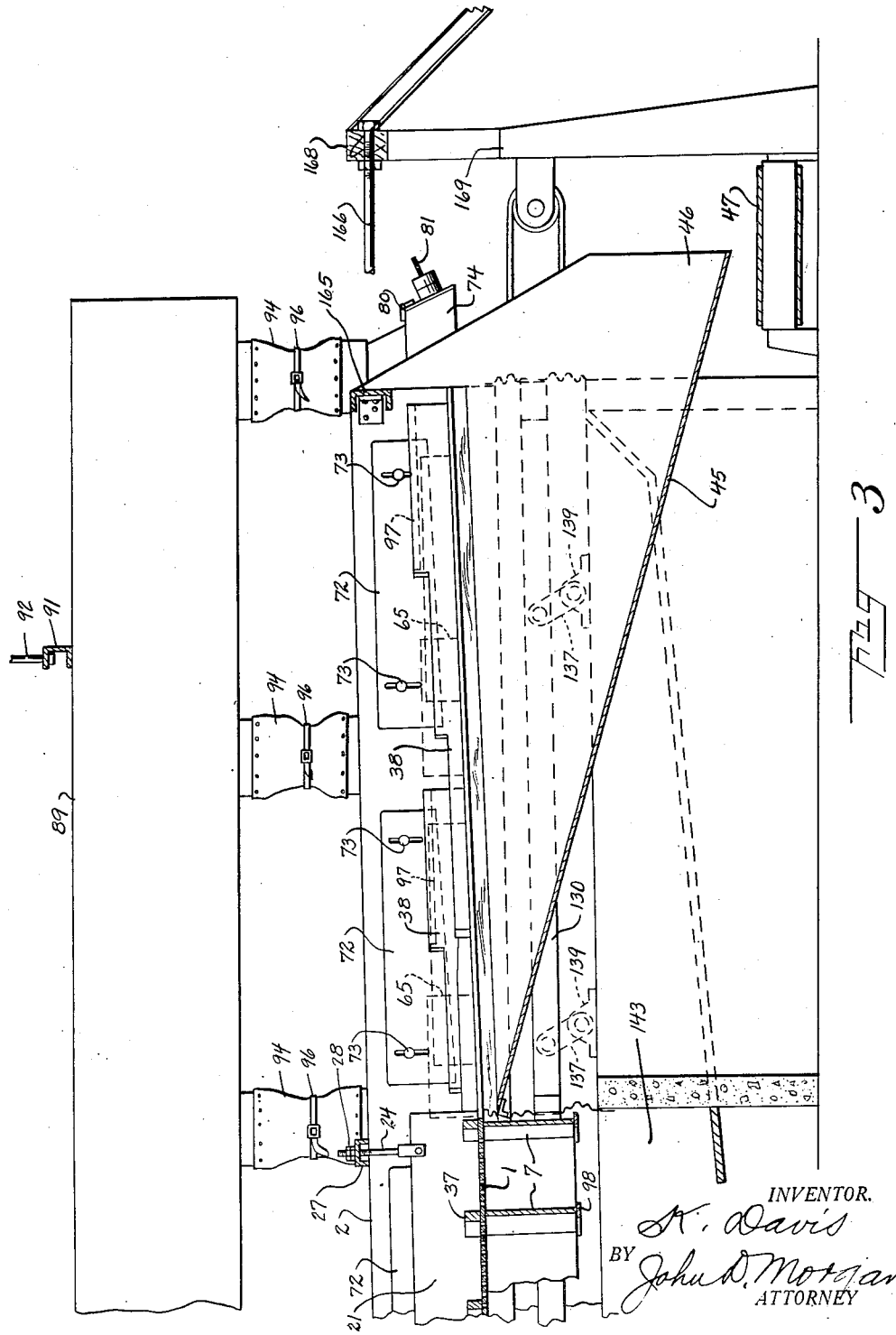

Aug. 22, 1933.   K. DAVIS   1,923,917
PROCESS AND MECHANISM FOR SEPARATING INTERMIXED DIVIDED MATERIALS
Filed June 20, 1927   8 Sheets-Sheet 4
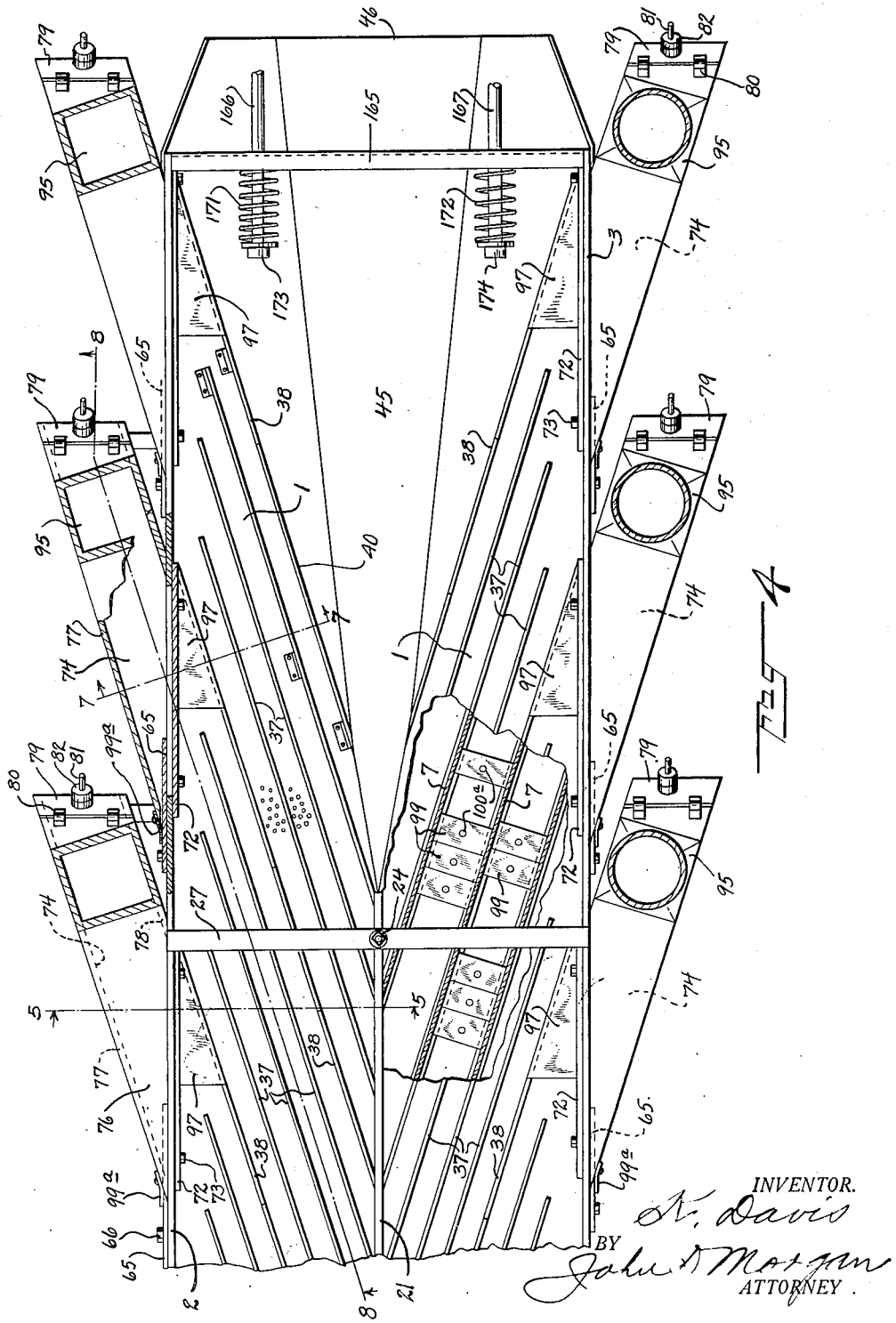
INVENTOR.
K. Davis
BY John D. Morgan
ATTORNEY.

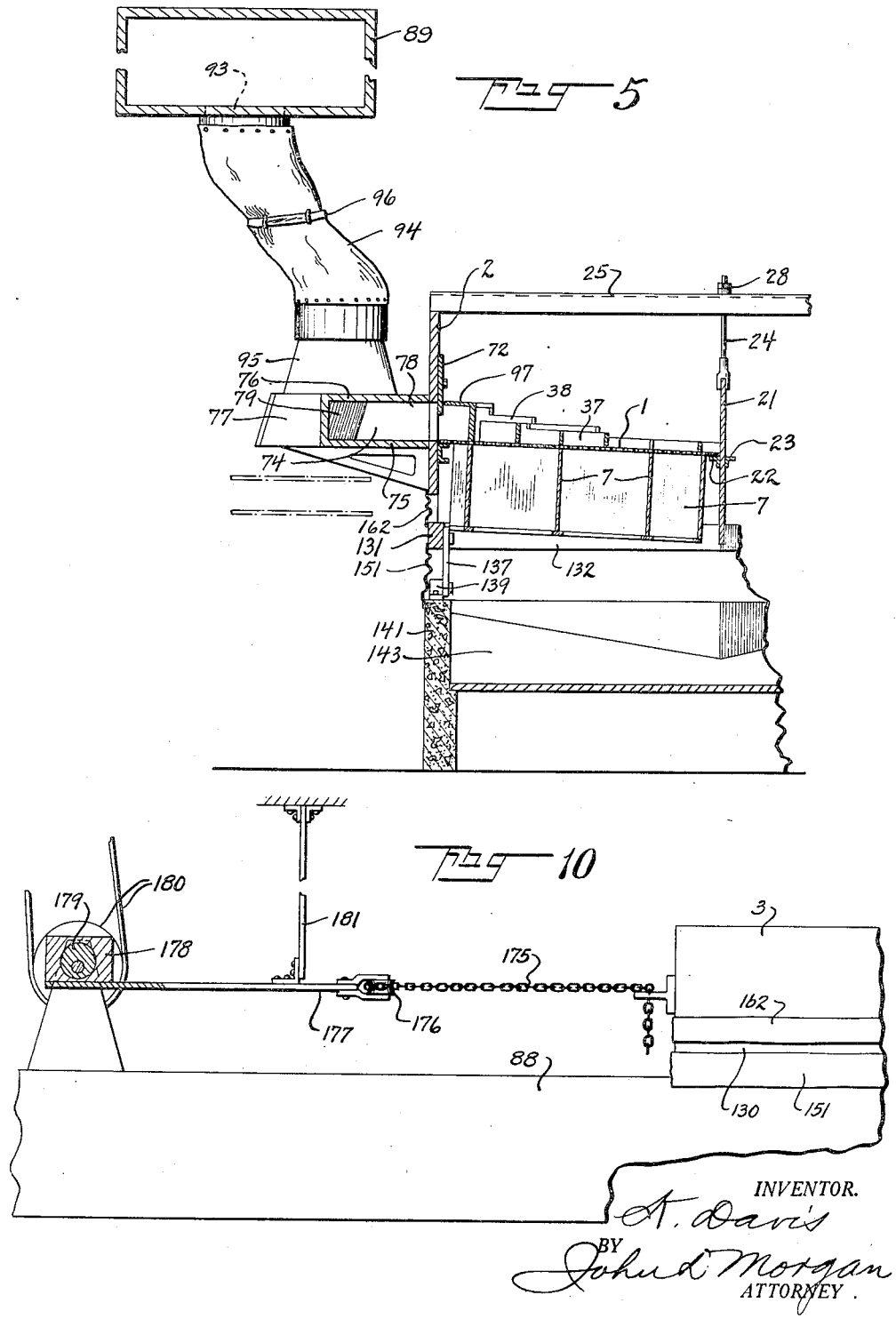

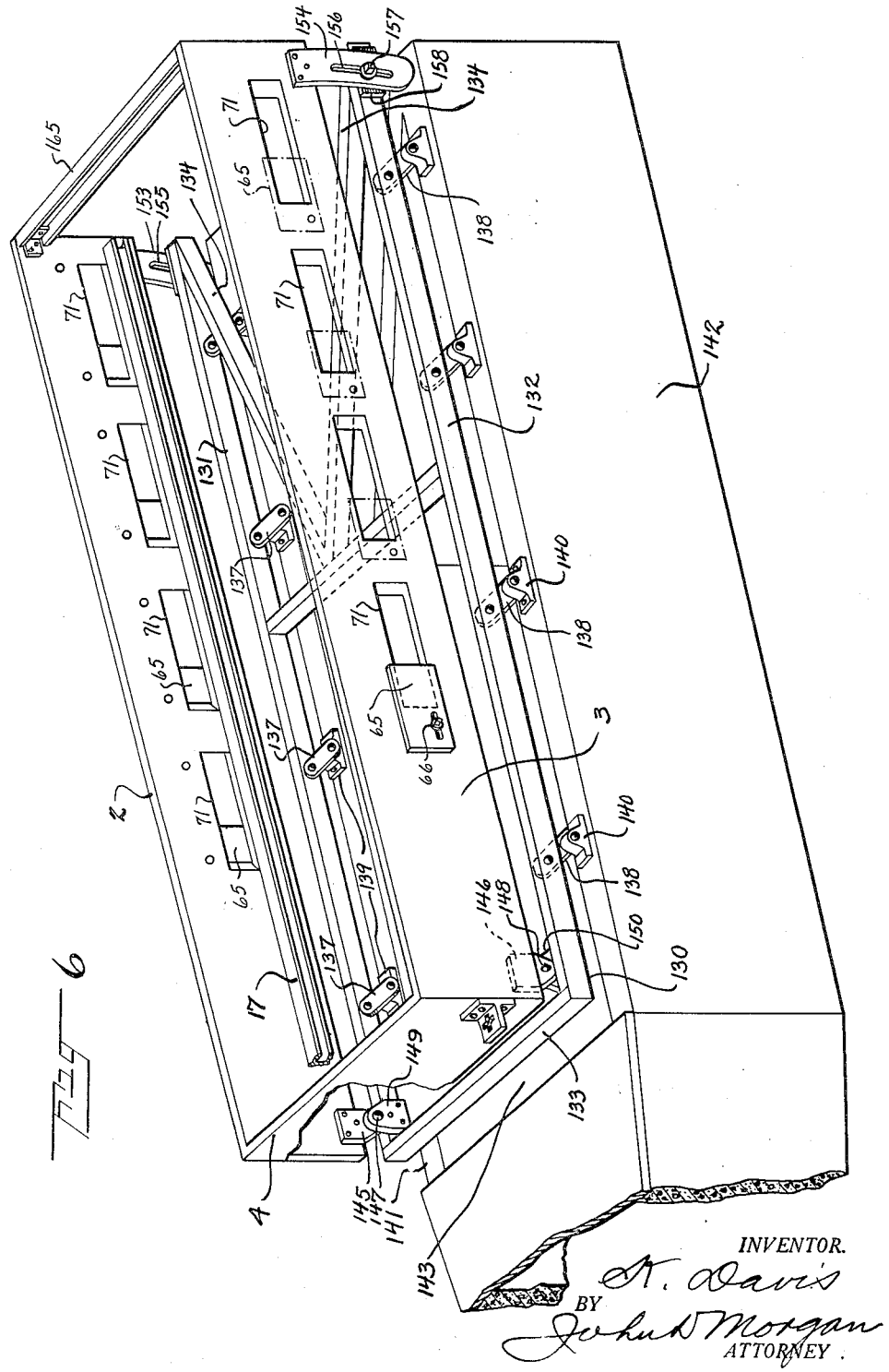

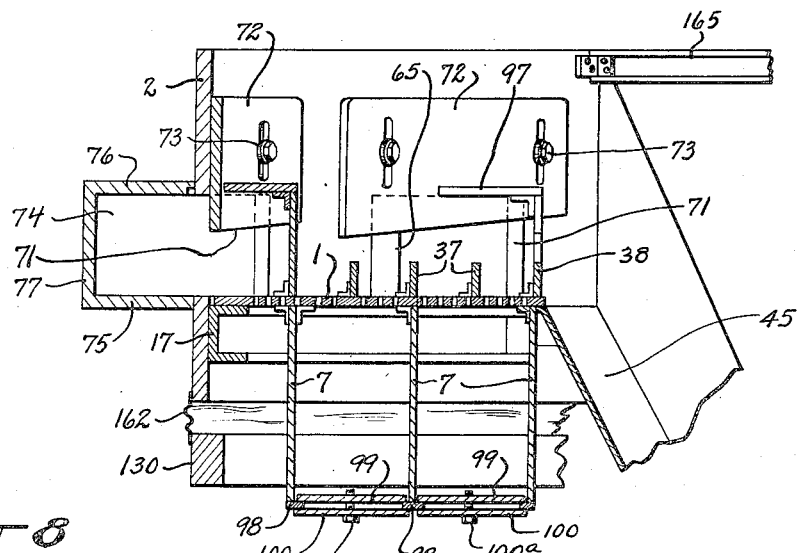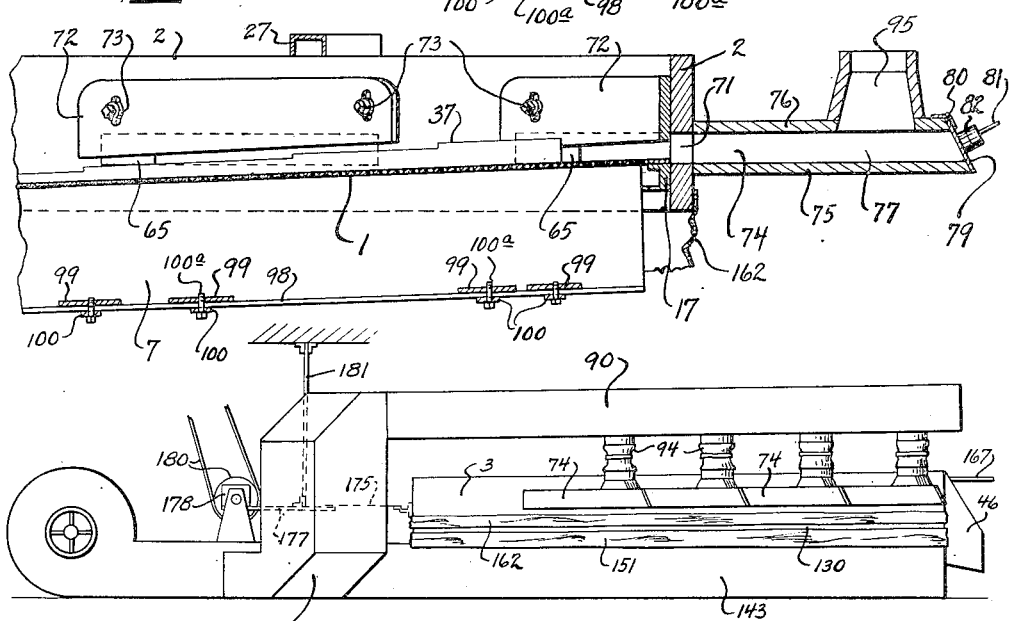

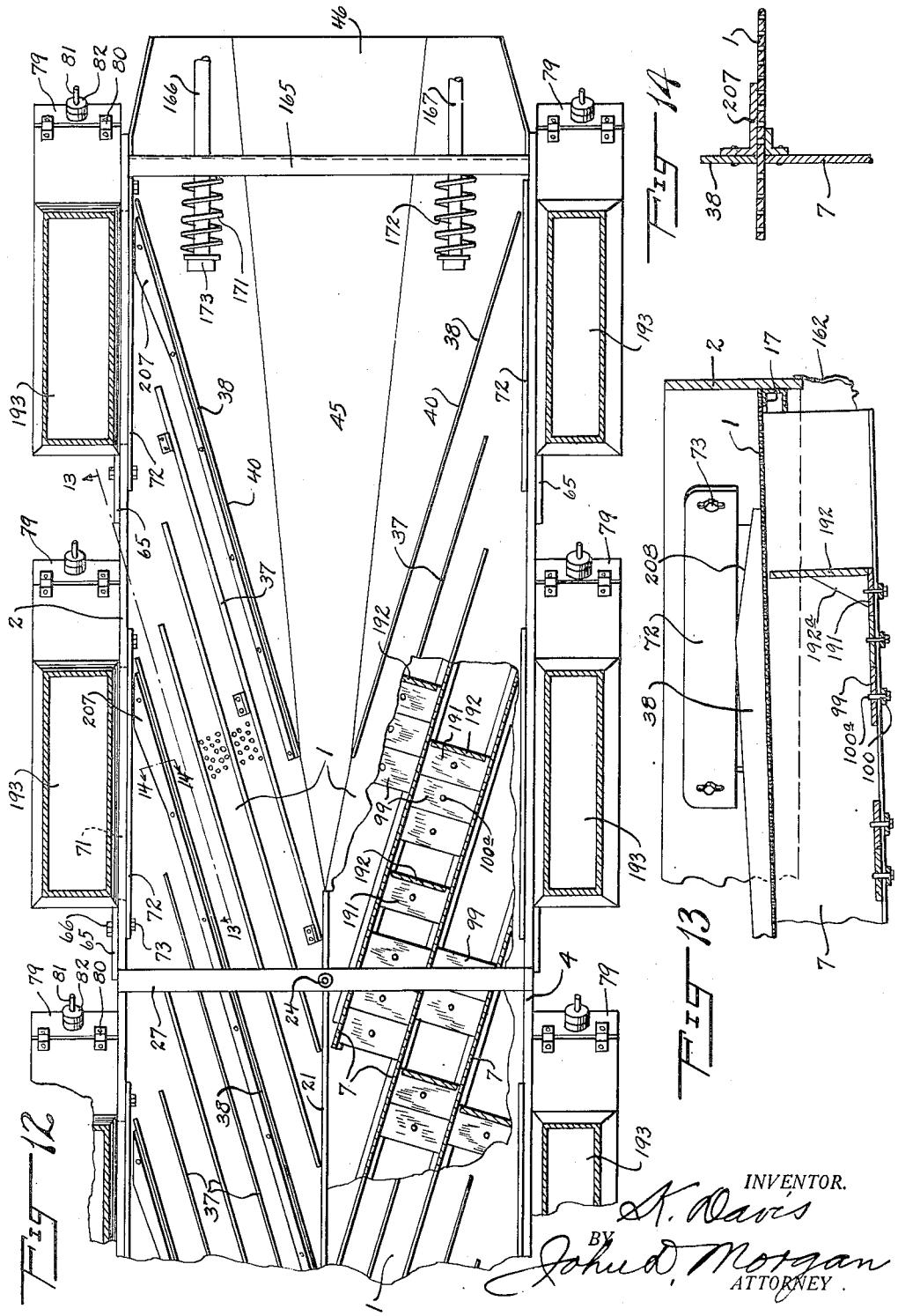

Patented Aug. 22, 1933

1,923,917

UNITED STATES PATENT OFFICE 1,923,917

PROCESS AND MECHANISM FOR SEPARATING INTERMIXED DIVIDED MATERIALS

Kenneth Davis, Ebensburg, Pa., assignor, by mesne assignments, to Peale-Davis Company, Wilmington, Del., a Corporation of Delaware Application June 20, 1927. Serial No. 200,080

18 Claims. (Cl. 209—467)

The invention relates to a novel and useful process and mechanism for separating intermixed, divided materials, and more particularly to such a process and mechanism especially adapted and capacitated for separating intermixed, divided materials wherein the pieces or particles vary relatively very greatly in size but vary relatively little in their specific gravities.

Objects and advantages of the invention will be set forth in part hereinafter, and in part will be obvious herefrom, or may be learned by practicing the invention; such objects and advantages being realized and attained by the steps and through the instrumentalities pointed out in the appended claims.

The invention consists in the steps, processes, parts, combinations, improvements, constructions and arrangements herein shown and described.

The accompanying drawings, herein referred to and constituting a part hereof, illustrate one embodiment of the invention and the preferred manner of practicing the same, said drawings together with a description serving to illustrate the principles of the invention.

Of the drawings:

Fig. 1 is a top plan, with parts in section and parts broken away, of a mechanism embodying the invention;

Fig. 2 is a fragmentary vertical, longitudinal section on an enlarged scale, of the rear or left-hand portion of the mechanism of Fig. 1 and is taken on the line 2—2 of Fig. 1;

Fig. 3 is a vertical, longitudinal section, similar to Fig. 2, but showing the forward or right-hand part of the mechanism of Fig. 1, and is taken on the line 3—3 of Fig. 1;

Fig. 4 is a fragmentary, enlarged plan of a part of the forward or right-hand end of the mechanism of Fig. 1;

Fig. 5 is a fragmentary, transverse section taken substantially on the line 5—5 of Fig. 4;

Fig. 6 is an isometric, perspective view of the stationary air chamber and the vibrating table-supporting mechanism of the preceding figures;

Fig. 7 is a fragmentary, vertical section, on an enlarged scale, taken on the line 7—7 of Fig. 4;

Fig. 8 is a vertical section taken on the line 8—8 of Fig. 4;

Fig. 9 is a side elevation, on a decreased scale, corresponding to Fig. 1, and also showing the fan;

Fig. 10 is a fragmentary elevation, with parts in section, and on an enlarged scale, of the table-actuating mechanism shown near the left-hand end of Fig. 9; and Fig. 11 is a diagrammatic view of one system of air zoning for the table deck.

Fig. 12 is a fragmentary, enlarged plan, corresponding to Fig. 1, with parts in section and parts broken away, showing modified forms of certain features of the invention.

Fig. 13 is a section taken on line 13—13 of Fig. 12; and

Fig. 14 is a sectional detail on line 14—14 of Fig. 12.

The invention is directed to a method and mechanism for separating intermixed, divided materials, and in certain of its features it is in the nature of an improvement on my co-pending application Ser. No. 190,925 filed May 12, 1927; but in other of its features, the invention has a general application to the class or type of mechanisms to which it pertains.

The term "divided" used with reference to the materials is employed to designate broken, fragmentary, granular, particulate, pulverulent or other materials comprising separate pieces or parts of different kinds of materials. The invention is more particularly directed, however, to effecting automatic separation of such mixtures of materials wherein the various pieces or particles of the different kinds of materials vary very greatly in size, but vary relatively very little in their specific gravities.

The terms "lighter" and "heavier" as used hereinafter will be understood as applying to the specific gravities of the various intermixed, divided materials, and not to the difference in mass of particular pieces of various sizes.

One kind of intermixed, divided materials, which the invention is especially capacitated to successfully separate is a mixture of coal, "bony", rock and other impurities, as it comes from the mine, the rock and other impurities being separated from the coal by my invention entirely automatically, and without previous sizing of the materials except as to crushing or removal of the very largest lumps.

To successfully commercially separate such materials presents a problem of great practical difficulty, due principally to the conditions stated. Separating work of this kind requires practically an entirely different process and mechanism or apparatus from the separation of materials which are very finely pulverized, or which vary very widely in their specific gravities, or which are very carefully and extensively sized prior to the separating process. I have especially directed my invention, in one of its features, to increasing the size range which the mechanism will successfully separate, and having in view especially "run of the mine coal", so as to satisfactorily and practically completely remove all impurities from the coal as it comes from the mine, with no previous preparation except the crushing of very large lumps, which in any event would damage the mechanism. The mechanism and method of my present invention is capacitated to successfully clean coal from four inches in size down to the finest dust, although my invention is not to be considered as being so limited.

According to previous commercial practice, except by the cleaning tables disclosed in and covered by certain related copending applications, it has been necessary to very closely size the coal by preliminary screening before attempting the automatic separation of the intermixed coal, bony and rock.

As an example of necessary previous commercial screening preparatory to separating:—All sizes above two inches were screened out; from two inches to 1 and ½ inches were screened as to the next size; then from 1½ inches to 1 inch; from 1 inch to ½ inch; from ½ inch to ¼ inch; from ¼ inch to ⅛ inch; from ⅛ inch to 1/16 inch; and from 1/16 inch down were screened out on successive screens. Each of these sizes is then sent to a different separating table. Thus seven or eight different screens are required and seven or eight separating tables, one for each different size of the intermixed materials produced by screening, making about fourteen or more machines and operations in all.

I dispense with all of the screening mechanisms of the prior art and with all but one of the separating tables. I use only a single large separating table, and over this single table I send the unprepared, intermixed materials, which prior to my invention were necessarily sent first over the several screening mechanisms, and then over the corresponding separating tables, as described in the preceding paragraphs. I am able on this one table to practically completely separate the coal, rock, and bony and other impurities from say four inches in dimension down to the finest dust. However, when the coal and impurities are adherent together, such conglomerate pieces will necessarily go with either the coal or the refuse, dependent upon their resultant specific gravities due to the proportion of coal and impurities so conglomerated. With such pieces, in any machine or process, it is necessary that they be crushed or treated to effect separation of the coal and refuse material. This can be done secondarily to meet this condition inherent in many coals, and does not essentially affect the capacity or operation of the table and process of my invention as such.

The invention is applied to the kind of table in which the intermixed materials are fed on at a locus which is at or near the rear end of the table, and preferably entirely across the end, at a rate which is regulated or controlled to build up at the beginning, and thereafter to continuously maintain upon the table a bed of materials of considerable thickness, which moves gradually forwardly over the table, and is progressively stratified and separated. The forward travel and the progressive stratification and separation of this continuous and forwardly-flowing bed of intermixed, divided materials, such as the mixture of unsized coal, bony and rock, the bed of materials being supported upon an air-pervious table is effected by the structure and longitudinal reciprocation of the table, and by the blast of air driven from beneath the table creating lifting air currents upwardly through the bed of forwardly progressing materials, these gradually approaching complete separation, which is effected before the separated materials are delivered from the table.

One of the principal functions and advantages of my present invention is in the very advantageous movement and handling of the materials in the bed and during the progress of the stratifying and separating process and the very rapid travel of and the practically immediate discharge of the materials as soon as separated, and the avoidance of maintaining streams or masses of the separated materials, especially of refuse, upon the table. The coal or other lighter superior stratum flows unconstrainedly, longitudinally forwardly along the table to discharge at the forward end thereof, the flowing current of this stratum being most rapid and free along the central part of the table, thus traveling and delivering the lighter superior stratum with the greatest celerity and with the least expenditure of mechanical energy. By my invention also the rock or other heavier material is conveyed, practically immediately that it has settled upon the table, laterally out of the bed of forwardly-flowing material, and is immediately discharged from the table. Thus in the case of the heavier material also the path of travel and the amount of mechanical energy expended are reduced to a minimum, and the creation and handling of a long, wide and thick stream of settled refuse is avoided, together with the trouble and energy waste involved therewith.

In the air action on the bed of forwardly-progressing materials, the blast or rather the buoying or lifting power thereof is minutely regulable throughout the table between a very small volume or intensity up to a relatively very large volume or intensity.

The table at the same time is longitudinally reciprocated to aid the separating action and the forward travel of the bed of materials gradually undergoing separation, and to mechanically progress the separated heavier material, which has settled upon the table, by friction and inertia toward a place of delivery. The gradation of the force of the buoying air currents, and especially the nice, varied minutely localized, and entirely flexible control of the air current action, and the action of the improved table structure, cooperate in the novel manner hereinafter described to accomplish, in connection with other instrumentalities, the desired result.

The invention further provides in connection with the capabilities and advantages enumerated a very compact structure and a relatively small table, in proportion to the quantity of materials separated, requiring an exceedingly small expenditure of power for the driving of the table, and especially for creating the material-buoying air currents passing through the bed, while maintaining a very high output of successfully cleaned or separated material.

My invention in its present preferred form, broadly considered, comprises an air-pervious deck with rear and side walls sufficient to maintain a bed of materials thereon undergoing progressive stratification and separation. The table is relatively long and narrow, and may be of substantially rectangular form, although this form may be widely varied, the table, however, having at the forward end thereof a proportionately very great discharge area for the lighter separated material, so as to provide for the rapid and facile flow and discharge of this lighter material as described. The table is longitudinally reciprocable, and is transversely angularly variably positionable as may be necessary or desirable in the most efficient operation with various kinds of intermixed materials. The table is also preferably longitudinally variably angularly positionable, and this inclination may be widely varied both in degree and direction as may be found most desirable or efficient.

The preferred embodiment of the air pervious table is inclined, upwardly and outwardly transversely from a substantially central longitudinal axis thereof, the inclination of the two parts of the table being variable as already indicated and later described in detail, this double or duplex form of table operating as a unit being comprised by certain features of my invention. The table, whether of single or double form, has separating partitions, spaced apart and preferably parallelly arranged, with their rear and inner ends at or near the central lower edge of the two table halves, (in the duplex type), and they are outwardly or upwardly and forwardly inclined, terminating somewhat short of the side retaining walls of the table, thereby impelling the settled rock or other heavier material directly and immediately from all parts of the bed to the side edges thereof and thence to discharge.

Controllable and regulable discharge means are provided for the settled rock as soon as it reaches the side edge of the bed, comprising discharge apertures variable in area, discharge gates with regulable pressure means to control the rate of flow and thickness of the discharging stream of refuse, and to prevent any discharge of the lighter material.

The separating partitions preferably increase in height outwardly toward the side edges of the table, and thus cooperate to maintain a bed of at least approximately uniform thickness crosswise of the table, while contributing to the rapid and free forward flow especially of the central part of the stratified coal or lighter material. In connection therewith there are preferably provided divisional partitions, somewhat higher than the ordinary separating partitions, in line with the forward end of each of the discharge devices. These contribute to prevent and obviate the concentration of the settled rock or other refuse into a relatively large and forwardly-flowing stream, and to compel the immediate and segregated discharge of the settled refuse, which feature contributes so largely to the mechanical efficiency and economy of the table.

Means are likewise provided for regulating the relative amount of the intermixed materials fed on to the rear end of the table substantially at the rate of cleaning and discharge from the table, and also to regulate the feeding on transversely of the rear, feeding on end, so that the rate of feed of the materials may be regulated with respect to the transverse inclination of the table and the means tending to travel the materials upwardly and outwardly of the table, this feed regulation thus contributing to regulate the thickness of the bed transversely of the table, and in the different parts thereof, transversely considered.

In connection with the foregoing, various means are employed for regulating and directing the action of the air currents upon the materials during the process of stratification and separation, and also to insure a clean and sharp division in the discharge of the separated materials. For this purpose the intensity of the air action in different parts of the table is regulated in connection with the gradual progress of the separation of the materials constituting the bed as it progresses forwardly along the table. This regulation of the lifting action of the air currents is very accurate and entirely flexible, and may be localized practically as minutely as desired. These features of my invention may be utilized either in connection with a general air current zoning of the entire table, or without any such zoning, as may be more desirable or efficient in any particular case. Thus any local inefficiencies in separation even in restricted areas in the bed, may be rectified, whether arising from too powerful or too weak an air buoying, or lifting action in such area.

If it is desired or necessary to separate and discharge an intermediate product, that is, one of intermediate specific gravity, such as the "bony" frequently intermixed with the coal and rock and other impurities, this can be done at the forward ends of the side edges of the table without any special mechanism being necessary. Or if with particular materials or physical condition of materials, this should be impracticable or not desired, a mechanism could be employed such as is shown for this purpose in my copending application Serial No. 190,925, filed May 12, 1927. The foregoing general description, and the appended detailed description as well, are explanatory and exemplary of the invention, but are not restrictive thereof.

Referring now in detail to the embodiment of the invention illustrated by way of example in the accompanying drawings, an air pervious deck or table 1, which may consist of a perforate metal plate or series of plates is provided, supported on a suitable frame within side and rear-end retaining walls 2, 3 and 4, for the bed of intermixed materials maintained upon the table.

The bed or deck 1 is preferably duplex, that is, it is separated centrally and longitudinally into two parts, as will be clear from Figs. 1 and 5, the abutting central edges of the two parts being vertically movable to effect the regulation of the transverse or sidewise inclination of the bed. For this purpose, the two halves of the perforate deck 1 are provided with transversely-disposed, stiffening members 7, affixed thereto. These members 7 also constitute a part of the air-current control means, as will be later described. At the side edges thereof the two parts of the table rest upon corresponding channel frame members 17, (Figs. 5 and 7) fixed to the lower part of the side walls 2 and 3 of the table.

The inner, longitudinally-disposed side edges of the two parts of the deck 1 abut upon the longitudinally-disposed vertically-projecting partition wall 21, extending from the rear retaining wall 4 of the table to the central part of the discharge edge for the coal or other lighter material. Fixed to either side of the central portion of the separating wall 21, are angle beams 22 and 23, which support the inner side edges of the two parts of the deck 1, as best appears from Fig. 5. The central partition wall 21 extends downwardly below the table, and this downward extension is utilized as a part of the air-current control means. Pivotally connected at various points along the top edge of the separating wall 21 are a series of supporting rods 24, which are screw-threaded at their upper ends, which pass through apertures in supporting cross-bars 25, 26 and 27. The outer ends of these cross-bars rest upon the tops of the side-walls 3 and 4 of the bed. The nuts 28 screw-threaded on these rods, may be turned to raise and lower the separating wall 21 and therewith the inner edges of the two parts of the bed, thereby varying the inclination transversely of the two halves of the bed, as may be desired.

The bed is provided on the upper surface thereof with a series of spaced-apart and parallelly-arranged separating partitions 37, which preferably begin against the rear wall 4 of the table, and extend forwardly and outwardly, and terminate short of the side retaining-walls 2 and 3. Farther forwardly along the table the separating partitions abut on the wall 21, with just sufficient clearance to permit the vertical positioning of the table.

The separating partitions are preferably adapted, either for a part of, or throughout, the length of the table to contribute to creating and maintaining a bed of practically uniform thickness transversely of the table. Accordingly (Figs. 3, 5 and 8) the separating partitions increase in height outwardly and forwardly, and this increase may be uniform, but is shown as occurring in steps. Thus they assist in impelling the still unseparated materials upwardly along the bed so that a substantially uniform separating action occurs entirely out to the side edges. The separating partitions may also vary in height longitudinally of the table.

The plurality of discharge means for the separated and settled heavier material are located preferably closely contiguous to each other along the side walls of the table, and the outer ends of the rock passages between the separating partitions discharge into these discharge means, as best appears from Figs. 1 and 4.

In accordance with one feature of my invention, divisional partitions 38 are preferably provided, substantially in line with the forward side of the openings in the table side walls and of the corresponding discharge means. These partitions are preferably somewhat higher than the separating partitions and conduce to complete the separating action so far as possible up to that point. These divisional partitions also at their forward ends are substantially of the height of the corresponding discharge opening in the side wall of the table (Fig. 3). These divisional partitions may be of increased height progressively forwardly along the table. The larger pieces of heavier material may thus roll over the earlier divisional partitions but will settle behind the later ones and the larger pieces of semi-flotant lighter material will pass over them all and be discharged at the forward end of the table.

The forward and discharge end of the table for the superior stratified material is made as long as practicable and extends for the whole width of the table, and accordingly this front discharge edge 40 is of V shape, as best shown in Fig. 1, and inclined inwardly and rearwardly from the front ends of the side bed-retaining walls 2 and 3. The discharge edge thus extends a long distance backwardly into the table, in the present instance considerably more than one-third of the length of the table, although it will be understood that this relation may be very widely varied as found desirable and efficient under various circumstances and with different intermixed materials.

Means are provided for taking off and delivering the separated superior stratum of coal or other lighter material, and as embodied a chute 45 is connected at its upper edge along the discharge edge 40, and is inclined forwardly and downwardly and inwardly, and terminates in the forwardly-inclined spout 46, which discharges on to an endless conveyor belt 47, or other suitable conveying device.

Means are provided by the invention, as already briefly indicated, for taking off the rock, or other separated and settled heavier material, at a plurality of points along the side edges of the table, as quickly as possible after it has settled upon the table, and by the shortest practical route. The number of these devices and the particular form thereof may be widely varied as may be desirable to accomplish the objects in view. The amount and manner of the discharge of the material from the various devices is likewise regulable for the purposes indicated. In Fig. 1 there are four discharge devices for the rock shown at either side of the table, and these devices are shown in more detail in Figs. 1, 2, 3, 5 and 8.

The rock discharge devices are positioned with respect to the separating and divisional partitions to take off the settled rock or other heavier material immediately on its reaching the side edge of the bed. In the present embodiment said means comprises an opening 71, which in its full extent occupies the greater part of the space between two divisional partitions. The extent of the openings 71 are longitudinally variable, and for this purpose (Figs. 2 and 4) slides 65 are longitudinally slidably mounted at the rear side of the openings 71, and on the outer face of the corresponding side wall of the table. The respective slides 65 are so slidably mounted on the table side wall by bolt and slot connections 66 (Figs. 2 and 6). Thus the longitudinal size of these openings 71 may be varied as desired, the change being preferably effected at the rear of the opening. This regulative capacity is of great usefulness in controlling the discharge at each of these openings so as to secure the most efficient separation.

Devices may likewise be provided for regulating the height of the discharge openings. These devices serve to regulate the height of the stream of refuse discharged through the opening, and will be set to let only refuse pass and to permit a full flow of such refuse. As embodied, said devices comprise sliding plates 72 arranged above the openings with bolt and slot mountings 73 on the side wall, whereby the plates 72 are vertically positionable, as already stated, not only to vary the area of the discharge openings 71, but also to regulate the height or thickness of the escaping bed of rock or other heavier material.

In the embodied form of the external refuse discharging means, there are, exteriorly to these openings, passageways 74 having bottoms 75 and tops 76 and side walls 77 and 78. At the exterior discharge end thereof these passages are preferably provided with pressure-regulating discharge controlling devices, shown as gates 79, hinged at 80 at the tops of these passages. The gates are provided with outwardly-extending pins 81, upon which may be placed, if desired, weights 82 to regulate the amount of pressure exerted against the outwardly-moving stream of rock or other heavier material and to control the travel or rate of flow of the refuse, and cooperate with the devices already described to effect a discharge of all the refuse separated and gathered at this point, while preventing discharge of the coal. Thus the separated rock is impelled by friction and inertia and by the separating partitions to the bottom of the side edge of the bed, and is forced outwardly through the channels 39. By positioning the plates 65 and 72, and by regulating the pressure on the gates 79, the flow of the rock may be regulated so as to just fill the openings in the side walls of the table to permit the passage of all the separated rock at this point, but preventing the escape of coal or other lighter material. The gates 79 also operate to regulate the air pressure which is forced into the bed through the openings 71.

Means are optionally provided for utilizing air pressure as a further check against discharge of the lighter material. In the embodied form thereof, devices are provided for forcing a regulable current of air backwardly through the rock-discharge channels 74 into the bed. In the embodied form thereof, mains or headers 85 and 86 are taken off at either side of the main air conduit 88, and are carried forwardly and upwardly (as best appears from Figs. 1, 2, 3, 5, and 9), to communicate with headers 89 and 90 extending along at either side and above the table, and supported by short cross-beams 91, fixed to the top thereof and carried by corresponding supporting rods 92. At each of the side rock discharges 74 there is an opening 93 in the bottom of the corresponding header, which connects by a flexible tube 94 with a flaring pipe 95, opening into the top of the corresponding rock channel 74. The flow of air through the conduits or tubes 94 may be regulated by suitable means, such as straps 96 encircling the tubes. There is thereby provided a regulable air pressure or air current supply for each of the discharge channels, the pipe 94 giving a flexible connection to allow for the vibration of the table.

Further devices may be used optionally to cooperate with these air pressure devices, and as embodied comprise a hood or shelf 97 (Figs. 4 and 7), covering the space between the forward end of the corresponding divisional partition 38 and the side wall of the table, just above the opening 71. These hoods serve as a floor for the passing flotant superior stratum of coal to prevent any sinking thereof at these corners, and also serve to project the deterring air currents coming backwardly through the opening 71 straight back into the advancing stream of rock. An air seal flap or flange 99ª (Fig. 4), of any suitable resilient material, is provided at the edge of the channel abutting on the slide 65, pressing against the slide to make a tight joint.

The intensity of the air currents forced upwardly through the air pervious deck 1 is variously controlled so far as concerns the broader features of my invention, as may be found most efficient and desirable. With many kinds of materials it will be found that the most intense air action is needed at the rear end of the table, and in the present embodiment a large proportion of the rear end of the table is subjected to air currents of greater intensity, that is, air lifting or buoying power, reference being made to diagrammatic Fig. 11. In this figure I have shown illustratively three areas of different air buoying action or intensity, the greater being indicated by $a$, and the area of less air current intensity or buoying power being indicated respectively by $b$ and $c$. It will be understood, however, that the relative intensities of the air currents and the relative proportions and positions of the corresponding areas may be widely varied, but in most instances a decreasing air current intensity forwardly and inwardly of the forward portion of the table will be found efficient with a large proportion of the rear end of the table subjected to a relatively great, if not the greatest air current intensity or lifting power.

In accordance with one feature of my invention, I provide means whereby the air action or buoying power may be widely and very flexibly regulated for very small areas, in any part of the table, irrespective of a general air zoning of the table or the absence thereof. By this means, after testing the table by running, I can quickly and easily rectify any defective air action in any small area of the table. Thus if there should be a dead spot with insufficient or no air lifting action, or a spot where this action is too strong, and the material is "boiling" or the air blowing through and tending to locally remix the separated materials, I can immediately rectify such defect without disturbing the general air action of the table. The means used are very simple but the effect is very important. As embodied (Figs. 2, 4 and 7) I provide projecting downwardly beneath the table deck partitions or flanges 7 (which are also utilized as table supports as already described). These are parallelly arranged, and are preferably just beneath the separating or divisional partitions, and divide the underneath side of the table into a series of chambers. At their bottom edges these partitions 7 are provided with horizontal supporting strips 98. Air control plates 99 extend across the bottoms of the chambers, and their ends rest upon the supporting strips 98. Clamping strips 100 and bolts 100ª may be used to hold the air plates in place. As many air plates may be used from time to time, and their positions may be changed, as may be desired or required.

Means are provided by the invention for feeding on the intermixed materials to the rear end of the table, and in connection therewith, devices for regulating the feed so as to maintain the bed of the desired thickness upon the table. In the embodied form thereof a hopper is provided having side walls 101 with an opening 105 at the bottom end thereof. Transversely across this opening is arranged a shaft 106, journaled in the side walls of the hopper. Fixed tangentially to the shaft 106 are a plurality of feeding blades 107, which rotate within a parti-cylindrical plate 110, fixed to the lower part of the hopper wall. The plates 107 at their ends are fixed to cylindrical plates 108 and 109 fixed on the shaft 106.

The shaft 106 is rotated by a variable-speed device, to regulate the rate of feed of the intermixed materials from the hopper, and such regulable speed driving means may be of any known or suitable form. A chute is provided for directing the materials from the hopper on to the rear end of the bed, and as shown it has a bottom 113 and side walls 114.

Means are provided for effecting a further regulation of the feed of the material transversely of the rear end of the table. This gives an additional regulation with respect to the degree of transverse inclination of the table. The specific form of such means may be widely varied, and I have utilized that shown and described in the copending application of Richard Peale, S. No. 183,262, filed April 13, 1927. As shown, a deflecting plate 117 is mounted in operative relation to one-half of the rear end of the table, and a similar device could likewise be used for the other half. The upper end of this plate has a bolt connecting 118, which is positionable in a plurality of holes in the bottom 113 of the chute, and the lower end of this plate has a bolt connection 120, which is positionable in a plurality of holes 121 in the bottom 113 of the chute (Fig. 2). Thus both the bottom and top ends of the deflecting plate 117 are independently positionable and any desired proportion of the intermixed materials may be fed on to any desired area of the corresponding width of the rear end of the table. A plurality of such deflecting plates may be used if desired. Usually a larger proportion of the material will be fed on the lower central part of the table, and this varies as will be found most desirable and efficient.

The preferred form of mounting and longitudinally vibrating or reciprocating the table are structurally combined in the present embodiment with means for varying the longitudinal inclination of the table, and the longitudinal inclination may be varied or reversed, or it may be horizontal, so far as concerns many features of my invention. In this embodiment the table is forwardly and upwardly inclined, with means for varying the angle thereof, and the table is likewise uniformly longitudinally reciprocated. It will be understood, however, that the speed and timing of the reciprocation may be varied by the use of any suitable devices.

In said embodied form (Figs. 2, 3, 5 and 6) a frame 131, having side reaches 131 and 132, and end reaches 133 and 134, is pivotally mounted at either side on the upper ends of corresponding series 137 and 138 of upwardly and rearwardly inclined supporting links, the lower ends of these series of links being pivotally mounted on corresponding series of brackets 139 and 140, mounted on the upper surface or edge of the side walls 141 and 142 of air chamber 143. Thus the table structure is longitudinally reciprocable with respect to the stationary air chamber.

In the embodied means for variably inclining the bed, the side walls 2 and 3 thereof are provided at the rear end with downwardly-projecting plates 145 and 146, respectively, which have pivotal bearings 147 and 148 in corresponding plates 149 and 150, fixed to and extending upwardly from the rear ends of the corresponding side frames 131 and 132. At the forward ends of the side walls 2 and 3 of the table there are provided downwardly-projecting plates 153 and 154, having arcuate slots 155 and 156 formed therein. Screw bolts 157 pass through these slots and are screw-threaded into corresponding plates 158, fixed on the forward end of the side frame members 131 and 132. Thus by means of the bolt and slot connections 157 and 158, the longitudinal inclination of the table may be suitably variable and regulated, and by means of the screw rods 24, as already described, the transverse inclination of the two halves of the table may be harmoniously regulated.

To make an air-tight connection between the various relatively movable parts, a flexible member 151, of canvas or other material, connects the upper part of the air chamber 143 with the frame 130, and a like flexible member 162 connects the frame with the side and end walls of the bed.

In the embodied form of table reciprocating means (Figs. 1, 2, 9 and 10) a resilient forward throw is imparted to the table, of relatively very small amplitude, the exact direction thereof being governed by the regulating means for the longitudinal positioning devices for the table. As embodied, there is a cross frame piece 165 at the front end of the reciprocable table frame. Two guiding and spring-supporting rods 166 and 167, are mounted in a horizontally-disposed supporting bar 168, which bar has its ends mounted in supporting pillars 169 and 170, which also serve to support the guide rollers for the two refuse conveyor belts. The rods 166 and 167 project loosely through apertures in the table bar 165, and helical springs 171 and 172 encircle the rods and are in compression between the bar 165 and nuts 173 and 174 screw-threaded on to the ends of the rod.

At the rear end of the table, a flexible member, such as a chain 175, is connected at either end (Figs. 1 and 10) to the rear end of the vibratable table frame. At its central part the chain 175 runs about a grooved pulley 176, journaled in the forward end of a supporting bar 177, fixed to a block 178, which serves as the strap of an eccentric 179, fixed on the shaft of the driving mechanism, shown herein as a belt and pulley drive 180. A resilient strip 181 is fixed to the bar 177 and to a support thereabove, shown conventionally, but any desired form of positioning, throw-varying, speed-varying, or other regulating devices may be employed therefor.

In Figs. 12 to 14 certain other forms of structure are shown, relating to the devices for centralling the lifting action of the air currents upon the bed of materials, and also for controlling the discharge of the refuse from the sides of the bed and maintaining the separation of the stratified materials at these various points of discharge.

Referring first to the means for the exact and minutely local control of the air-lifting action on the materials in the bed, air-control plates 191 are provided, having somewhat different construction and manner of operation from the air-control plates 99 previously described. The air-control plates 191 have vertically-disposed plates 192 fixed thereto and extending upwardly from the forward end thereof, these being preferably held in place by reinforcing pieces 192ª. These vertically-disposed plates 192 preferably extend upwardly so as to just clear the lower surface of the deck 1, and thus serve to practically close the space between the control plate 191 and the deck 1. Either the horizontal control plates 99 or the plates 191 may be of any width desired, or a plurality of units may be placed edge to edge to secure the same effect, as is shown in Figs. 12 and 13. The clamping strips 100 and bolts 100ª may be used with the air control plates 191. As already described in connection with the control plates 99, the control plates 191 and 192 may be optionally and variably positioned in any desired location beneath the table to secure either a uniform or gradated air action for effecting the most efficient separation.

Referring now to the form of the discharging and controlling means for the refuse, the external passageways 193, corresponding to the passageways 74 are shown disposed longitudinally along the outer sides of the side walls 3 and 4 of the table, instead of projecting outwardly at an angle as shown in the preceding figures of the drawings. The air-openings from the headers 89 and 90 into the top on the rock channels are shown of elongated form, and preferably of substantially the same length as the discharge openings 71 in the side walls of the table. This provides for separating or mixture preventing air currents passing into the side edges of the bed, practically perpendicularly to the bed, and with many intermixed materials or in certain physical conditions thereof will be found highly efficient.

In co-operation with the foregoing, there may be provided a dead space in the deck just within the discharge openings 71, and of such size and shape as may be found most desirable or efficient. As shown, a plate 207 is formed or positioned just at the rear of the divisional partitions 38, and at their junctures with the side walls of the table creating or causing at this point only an inwardly-directed, mixture-preventing air current uninfluenced or undisturbed by any vertically moving air current.

The forward ends of the divisional partitions 38 may be beveled forwardly and downwardly, as shown at 208, instead of continuing at full or increasing height to a juncture with the side wall of the table. If desired, also, the hoods 97 may be omitted. This arrangement, or modifications thereof, may be found useful or desirable in connection with separating certain intermixed materials, or certain conditions thereof. This form of the forward ends of the divisional partitions tend to prevent the choking or stagnation of the rock or other settled impurities at the juncture of the forward end of the divisional partitions with the side walls.

The manner of operation of the hereinbefore described mechanism is substantially as follows: It may be initially assumed that a bed of the materials undergoing gradual separation is maintained upon and is progressing forwardly along the table, the feed from the hopper to the rear end of the table being regulated to effect and to maintain this condition. The deflector plates may be used in such number and may be set so as to direct the material in greater or less proportion to various areas transversely of the table, usually feeding a greater proportion toward the central and lower part of the table. The transverse inclination of the two parts of the table, and the forward inclination thereof, if any, will have been determined for the greatest efficiency with the particular work being done.

It will be understood of course that a great variety of materials and in widely different conditions can be separated by my invention, and that the description of operation given may be regarded as a typical case and that there will be changes therefrom in many cases, and said description is explanatory and exemplary but is not binding in character. As the intermixed materials are deposited upon the table, the stratification, generally considered, occurs very rapidly and the greater part thereof is effected during a very short distance of the travel forwardly in the bed, the greater part of the heavier material settling upon the bed and the greater part of the lighter material being stratified above. The heavier material which has settled behind the first divisional partition, considering for convenience the single table or one side of the double table, is immediately impelled into the first refuse discharge opening 71. A part of the heavier material, while in line with the foregoing cross-wise of the table, will have become stratified and settle upon the table forwardly of the inner end of the first divisional partition, and will not be influenced thereby; and some of the larger pieces of rock, in this part of the table especially, will roll over the lower inner ends of the separating partitions and of the first divisional partition. This remainder of the heavier material will mostly settle in the second divisional area, and the separating partitions and the divisional partitions will direct it and impel it into the second refuse discharge opening 71. In practice, it will be found that most of the rock and heavier refuse will be discharged from these earlier refuse discharging devices. However, some of the heavier refuse, and even of the smaller particles may progress somewhat farther along the table, but will settle behind usually the next divisional partition, and will be discharged through the next refuse discharge opening 71.

Due to this action, the materials become gradually stratified, and the upper stratum of coal or other lighter material flows unconstrainedly forwardly to discharge at the forward end of the table, the most rapid movement being along the lowermost or central part of the table, thus giving a quick movement and early discharge to the stratified coal. That is, the particles of coal adjacent the inner wall 21 of the two separating decks are purified first by the outward transverse movement of the settled particles. Hence the inner portion of the coal stratum is the most freely flotant and is therefore least affected by the retarding action of the separating partitions. The operation of the table may be regulated so as to maintain a bed of substantially uniform thickness transversely of the table, the increasing height outwardly of the separating partitions, and the outward flow of the settled refuse both conducing to this. The superior stratum of separated and clean coal or other lighter material is buoyed and gradually purified by the air currents and the movement of the bed and flows directly forwardly of the bed along the path of least resistance and greatest mechanical efficiency.

The free bony, owing to its intermediate specific gravity, will settle later upon the table and be impelled to discharge at the more forwardly refuse discharging orifices, or a suitable bony discharging mechanism may be employed.

The "middlings", that is, the pieces of conglomerate coal and refuse can be discharged at the forward side of the table separately from either the coal or the refuse and can be conveyed away to be crushed, to separate the coal and refuse contained in such conglomerate pieces, which may then be separated.

The practically immediate discharge of the settled rock and other impurities is effected as already indicated, and I thereby avoid the concentration of large masses of refuse into a stream, and the impelling thereof for long distances along the table, with consequent waste of energy and likelihood of remixing separated materials. The regulation of the stream of refuse at each discharge locus is controlled, as already described, by regulating the size of the openings 71 in the side walls of the table, both longitudinally and vertically and by the air currents forced inwardly into the bed through the openings. These will control the size of the stream of refuse and also the height thereof so that the accumulated refuse will be in proper relation to the opening 71, to effect the discharge of all the refuse and prevent the coal from passing thereinto. The rate of flow of the stream of refuse is regulated by the means indicated and also cooperatively by the amount of weight placed upon the flapper gate and the end of the discharge chute, which offers a nicely regulable resistance to the free discharge of the stream of refuse so as to maintain the most efficient conditions of separation and discharge, and also operates to keep the incoming air current at the proper effective pressure. In case there is still some intermixture of the materials at any particular opening 71, the inward blowing stream of air will blow the particles of coal backwardly into the bed, and they will again undergo separation. The hoods over the top of the openings also prevent settling of any coal into the opening at these corners, and also direct the air backwardly into the bed.

By reason of the long, slanting edge, the discharge area for the coal or other superior stratum is very great, and also extends for a long distance backwardly into the table and provides for early and easy discharge of the coal as soon as stratified without any crowding or transverse pushing thereof, which leads to efficiency, large output, and prevents remixing of the materials.

Thus the separating action will progress forwardly along the table, the particles of rock and other refuse settling below the level of the separating partitions, and thus will travel toward the side edges of the table and substantially out of the bed, and even the finest rock dust, and other impurities will settle upon the table and be discharged in the manner described. The arrangement of the separating partitions and the divisional partitions is such that while the successive stages of settlement of refuse is across the table, the settled refuse is directed to successive discharge outlets, yet none of it is traveled very far but soon passes out at the side edge of the bed. The superior stratum of the separating coal will become greater and greater in volume and will finally be discharged at the forward end of the table at various points along the entire slanting discharge edge on the forward end of the table.

From the foregoing, it will be understood that a process and a mechanism for practising the same has been provided realizing the object and advantages set forth, together with other objects and advantages; and that departures may be made from the precise manner of carrying out the process, and from the details of structure of the mechanism, without departing from the principles of the invention and without sacrificing its chief advantages.

What I claim is:—

1. The process of separating intermixed divided materials varying relatively greatly in size but varying relatively little in their specific gravities which comprises maintaining a transversely and upwardly hollowed bed of the intermixed materials upon and progressing it along an air pervious table, separating and stratifying the intermixed materials of the bed by forcing air through the bed of materials and impelling a settled heavier material out of the bed upwardly and laterally without any collected flow of said settled material longitudinally of the bed and causing the superior stratum of lighter material to move unconstrainedly forwardly and more rapidly in the central part of the bed to discharge at the front end of the table.

2. The process of separating intermixed divided materials varying relatively greatly in size but varying relatively little in their specific gravities which comprises maintaining a bed of the intermixed materials upon and progressing it along an air pervious table, separating and stratifying the intermixed materials of the bed by forcing air through the bed of materials in varying degrees of intensity at different parts thereof, impelling the heavier material laterally toward both sides of the bed as soon as it settles to an inferior stratum, progressing the superior flotant stratum of lighter material freely forward of the bed, in a progressingly purified stream, and causing the central portion of said superior stratum to move more rapidly to discharge.

3. The process of separating intermixed divided materials varying relatively greatly in size but varying relatively little in their specific gravities which comprises maintaining a bed of the intermixed materials upon and progressing it along an air pervious table, separating and stratifying the intermixed materials of the bed by forcing air through the bed of materials in varying degrees of intensity at different parts thereof, impelling the heavier material laterally toward both sides of the bed as soon as it settles to an inferior stratum, progressing the superior flotant stratum of lighter material freely forward of the bed, in a progressingly purified stream, and causing the central portion of said superior stratum to move more rapidly to discharge, and increasing the discharge of the stream of purified flotant lighter material as the purification thereof increases.

4. A mechanism for separating intermixed divided materials varying relatively greatly in size and varying relatively little in specific gravities including in combination an air-pervious table, means for forcing air therethrough, and means for impelling a settled heavier material transversely to the edge of the table, pressure-controlled devices for immediately discharging the separated heavier material from the edge of the table, including means for directing a counter air current to the discharge devices to prevent remixing of the materials and means for independently regulating the air currents to the discharge devices.

5. A mechanism for separating intermixed divided materials varying relatively greatly in size and varying relatively little in specific gravities including in combination an air pervious table, means for forcing air therethrough, and means for impelling a settled heavier material transversely to the edge of the table, pressure-controlled devices for immediately discharging the separated heavier material from the edge of the table, including means for directing a counter air current to the discharge devices to prevent remixing of the materials and a member cooperating therewith for permitting unobstructed passage of the superior flotant material past the discharge device while preventing remixing of the materials.

6. The process of separating intermixed divided materials varying relatively greatly in size and relatively little in their specific gravities, which comprises maintaining a substantially deep bed of the intermixed materials upon an air-pervious table and subjecting it to the action of lifting air currents and mechanical vibration, impelling the lighter, superior stratified material forwardly in a laterally restrained stream straight throughout the length of said table to a place of discharge at the front of said table, impelling settled heavier material to discharge at the side of the table, and causing the inner and most rapidly purified portion of said superior stratum to progress forwardly more rapidly to discharge than the outlying portions thereof.

7. The process of separating intermixed divided materials varying relatively greatly in size and relatively little in their specific gravities, which comprises maintaining a substantially deep bed of the intremixed materials upon an air-pervious table and subjecting it to the action of lifting air currents and mechanical vibration, impelling the lighter, superior stratified material forwardly in a laterally restrained stream straight throughout the length of said table to a place of discharge at the front of said table, impelling settled heavier material by friction and inertia to the side edge of the table and discharging said material at a plurality of spaced apart points therealong, permitting limited longitudinal travel of the settled heavier material along the side edge of the table up to a given discharge point, and substantially totally blocking longitudinal travel of settled heavier material beyond said discharge point, whereby cumulative longitudinal flow of heavier material from one discharge point to another is prevented.

8. In a mechanism for separating intermixed divided materials, varying relatively greatly in size and relatively little in their specific gravities, the combination of a longitudinally reciprocable, air-pervious table for stratifying and separating a bed of the materials, a retaining wall disposed along a side of the table and having a plurality of spaced-apart apertures therein for discharging settled heavier material from the table, a plurality of separating partitions for guiding settled heavier material to the discharge apertures, the majority of said partitions stopping short of the side wall to leave an unobstructed pathway therealong for longitudinal flow of the heavier materials, and a plurality of spaced-apart blocking members disposed at intervals along the side wall for preventing collected longitudinal flow of the heavier materials.

9. In a mechanism for separating intermixed divided materials, varying relatively greatly in size and relatively little in their specific gravities, the combination of a longitudinally reciprocable, air-pervious table for stratifying and separating a bed of the materials, a retaining wall disposed along a side of the table and having a plurality of spaced-apart apertures therein for discharging settled heavier material from the table, a plurality of separating partitions for guiding settled heavier material to the discharge apertures, the majority of said partitions stopping short of the side wall to leave an unobstructed pathway therealong for longitudinal flow of the heavier materials, and means at each aperture for blocking the settled heavier material from longitudinal flow beyond said aperture.

10. In a mechanism for separating intermixed divided materials, the combination of a vibratable air-pervious table, a plurality of spaced-apart discharge opening for settled heavier material along a discharge edge thereof, means for supplying air under pressure to each discharge opening, and means for independently regulating the air supply for each discharge opening.

11. A separating mechanism of the class described comprising an air-pervious deck having a substantially continuous surface, a discharge opening along one edge of the deck, means for directing settled heavier material to the discharge orifice, means for progressing superposed lighter material at an angle to the movement of the settled heavier material continuously along the deck to discharge, and a member over the discharge orifice for supporting superposed lighter material in its travel beyond said orifice and to prevent said lighter material from escaping into the orifice.

12. The process of purifying coal which comprises maintaining a continuous, traveling bed of raw coal which has not been necessarily subjected to close preliminary size classification, reciprocating the bed, passing lifting and loosening air currents through the bed, subjecting the air currents to a progressive general gradation along the bed and to a further flexible and independent control through relatively small and localized areas of the bed, so that the air action at every point of the bed will be the resultant of the general gradation and the flexible control.

13. The process of purifying coal which comprises maintaining a continuous, traveling bed of raw coal which has not been necessarily subjected to close preliminary size classification, reciprocating the bed, passing lifting and loosening air currents through the bed, subjecting the air currents to a permanent and progressive general gradation along the bed and to a further flexible and independent control through relatively small and localized areas of the bed, so that the air action at every point of the bed will be the resultant of the general gradation and the flexible control.

14. A mechanism for separating intermixed divided materials including in combination an air-pervious table having its surface divided into a series of intermerging zones of progressively gradated perviosities, a main air chamber beneath the table for supplying air under pressure thereto, and means for locally and flexibly controlling the air action in subdivisions of said zones comprising a plurality of relatively small chambers in the air chamber beneath the zoned table, and means for independently controlling the admission of air from the main chamber to each of the small chambers.

15. A mechanism for purifying raw coal containing a wide range of sizes which have not necessarily been subjected to preliminary size classification and which contain large lumps and fine particles such as occur in coal as it comes from the mine including in combination a reciprocable, air-pervious table having a plurality of separating partitions thereon, means for maintaining a bed of said coal of substantial depth in progression therealong, means for passing lifting and loosening air currents through substantially all parts of the bed, the perviosity of the table being gradated to gradually and progressively modify the air intensity along the table, and means for flexibly and independently controlling the air supply to relatively small local subdivisions of the table surface whereby the air action at every point on the table will be the resultant of the gradation and the local control.

16. A mechanism for separating intermixed, divided materials including in combination an air-pervious table having a plurality of separating partitions thereon, means for maintaining a bed of raw coal of substantial depth in progression along the table, means for passing lifting and loosening air currents through the bed, means for gradating the air action along the bed comprising a series of intermerging zones of differing intensities, and means for flexibly and independently controlling the air supply to relatively small subdivisions of the bed whereby the air action at every point of the bed will be the resultant of the general gradation and the flexible control.

17. A mechanism for separating intermixed divided materials including in combination an air-pervious table having its surface divided into a series of intermerging zones of progressively gradated perviosities, a plurality of separating partitions extending over the zone's surface of the table, a main air chamber beneath the table for supplying air under pressure thereto, and means for locally and flexibly controlling the air action in subdivisions of said zones comprising a plurality of relatively small chambers in the air chamber beneath the zoned table, and means for independently controlling the admission of air from the main chamber to each of the small chambers.

18. In a mechanism for separating intermixed divided materials, varying relatively greatly in size and relatively little in their specific gravities, the combination of a longitudinally reciprocable, air pervious table for stratifying and separating a bed of the materials, a retaining wall disposed along a side of the table and having a plurality of spaced-apart apertures therein for discharging settled heavier material from the table, a plurality of separating partitions for guiding settled heavier material to the discharge apertures, the majority of said partitions stopping short of the side wall to leave an unobstructed pathway therealong for longitudinal flow of the heavier materials, but a few of said partitions at spaced-apart intervals extending substantially to the side wall to prevent collected longitudinal flow of the settled heavier materials.

KENNETH DAVIS.